US009197845B2

(12) United States Patent
Wan et al.

(10) Patent No.: US 9,197,845 B2
(45) Date of Patent: Nov. 24, 2015

(54) SYSTEM AND METHOD FOR PROCESSING VIDEO DATA

(71) Applicant: Broadcom Corporation, Irvine, CA (US)

(72) Inventors: Wade Keith Wan, Orange, CA (US); Darren Duane Neuman, Palo Alto, CA (US); Jason William Herrick, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/658,845

(22) Filed: Mar. 16, 2015

(65) Prior Publication Data

US 2015/0195485 A1 Jul. 9, 2015

Related U.S. Application Data

(63) Continuation of application No. 13/929,739, filed on Jun. 27, 2013, now Pat. No. 8,982,277.

(60) Provisional application No. 61/815,860, filed on Apr. 25, 2013.

(51) Int. Cl.
*H04N 7/01* (2006.01)
*H04N 21/00* (2011.01)
*H04N 19/46* (2014.01)
*H04N 7/08* (2006.01)
*H04N 13/00* (2006.01)
*H04N 19/44* (2014.01)

(52) U.S. Cl.
CPC ............... *H04N 7/01* (2013.01); *H04N 7/0806* (2013.01); *H04N 13/0048* (2013.01); *H04N 13/0066* (2013.01); *H04N 19/46* (2014.11); *H04N 21/00* (2013.01); *H04N 19/44* (2014.11)

(58) Field of Classification Search
CPC ....... H04N 7/012; H04N 7/01; H04N 7/0125; H04N 7/0117; H04N 7/0122; H04N 7/0127; H04N 7/0105
USPC .......... 348/441, 458, 459, 446, 448, 443, 445
IPC ............................................. H04N 7/01, 11/20
See application file for complete search history.

(56) References Cited

U.S. PATENT DOCUMENTS

2013/0271650 A1* 10/2013 Muto ............................ 348/441

* cited by examiner

*Primary Examiner* — Sherrie Hsia
(74) *Attorney, Agent, or Firm* — Brinks Gilson & Lione

(57) ABSTRACT

A system and method for video processing is provided. The system and method process a video stream having a first resolution video frame, the first resolution video frame comprising a plurality of second resolution video frames. In some implementations, a user input selection may be presented to select between a first operation mode and a second operation mode.

20 Claims, 11 Drawing Sheets

SYSTEM AND METHOD FOR PROCESSING VIDEO DATA

CROSS-REFERENCE TO RELATED APPLICATIONS BY REFERENCE

This patent application is a continuation application of non-provisional application Ser. No. 13/929,739, filed Jun. 27, 2013, and titled "System and Method For Processing Video Data," which is related to and claims priority from provisional patent application Ser. No. 61/815,860, filed Apr. 25, 2013, and titled "System And Method For Processing Video Data," the contents of which are hereby incorporated herein by reference in their entirety.

1. TECHNICAL FIELD

The present disclosure relates generally to a system and method for processing video data and more specifically to a system and method for processing video data comprising lower resolution video data embedded in higher resolution video data.

2. BACKGROUND

Modern video systems continue to push the boundaries of video resolution. However, modern video systems may not always be supplied video having a resolution equivalent to their maximum supported resolution. Many times video that is lower than the maximum supported resolution may be provided to the system. With the memory and hardware to support the higher resolution video format, the system may not be effectively utilized when supporting lower resolution video streams from legacy standards.

SUMMARY

A system and/or method for communicating information, substantially as shown in and/or described in connection with at least one of the figures, as set forth more completely in the claims.

DETAILED DESCRIPTION

Figure 1:
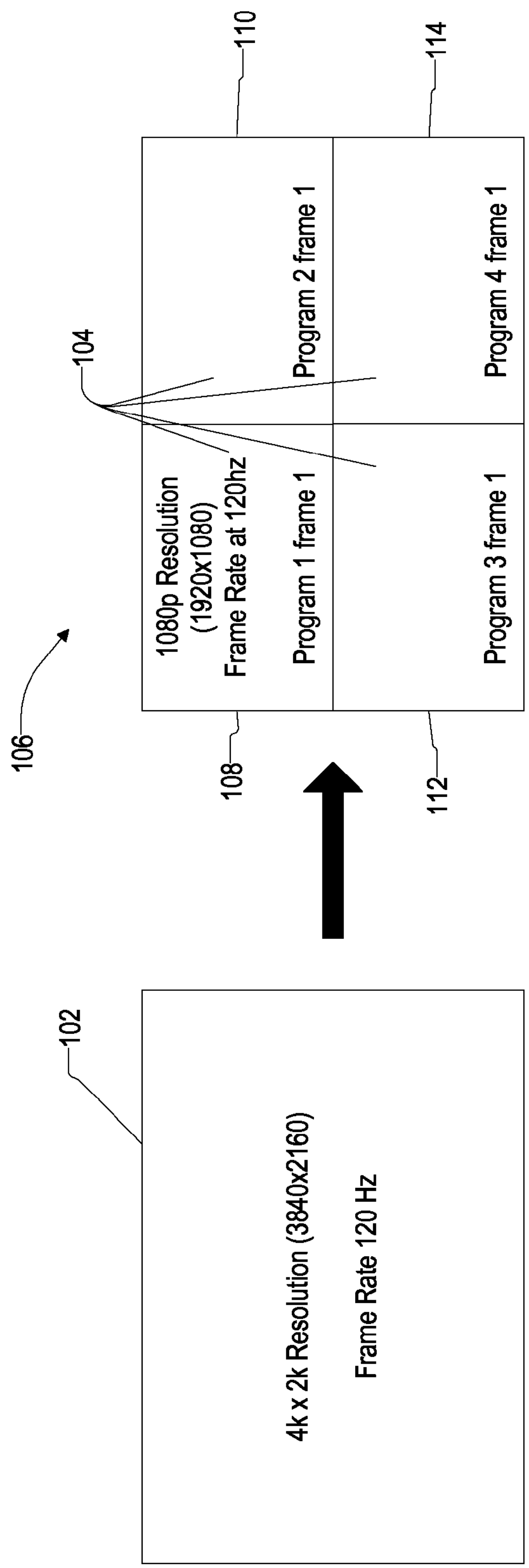
FIG. 1 is a diagram of a video frame having a first resolution comprising a plurality of video frames having a second resolution.

Referring to FIG. 1, a diagram of a video frame is provided. The video frame may have a first resolution and comprise a plurality of video frames having a second resolution. In this implementation, the video frame having the first resolution may define a higher resolution video frame 102 and the video frames having the second resolution may define lower resolution video frames 104. The lower resolution video frames 102 combined may form a combined higher resolution frame 106. The higher resolution video frame 102 may comprise a pixel resolution of 3840×2160, commonly known as 4k×2k resolution or Ultra HD resolution. In some embodiments, the frame rate of the higher resolution video frame may be 120 Hz, for example. However, it is understood that the frame rate may be any other video frame rate (e.g., 60 Hz, 240 Hz, 480 Hz, etc.). The combined higher resolution frame 106 may also comprise a total resolution of 3840×2160. The combined higher resolution frame 106 may further comprise a plurality of lower resolution video frames, such as 1080p resolution (i.e. each having a pixel resolution of 1920×1080).

In this example, the combined higher resolution frame 106 may comprise a plurality of portions or sections containing corresponding video content. In one or more embodiments, the corresponding to a first frame quadrant 108, a second frame quadrant 110, a third frame quadrant 112, and a fourth frame quadrant 114. The four different programs may be displayed in each of the frame quadrants 108, 110, 112, 114. Further, each of the frame quadrants 108, 110, 112, 114, may be 1080p resolution.

Though the resolutions of 1080p and 4k×2k are described in this implementation, other video resolutions may be applied in accordance with this disclosure, for example 720×480, 1280×720, 8k×4k as well as other standard and non-standard video resolutions. In some implementations the plurality of frames may comprise any number of frames located in a plurality of regions of a combined higher resolution frame. For example, the plurality of frames may comprise two to ten frames located in a corresponding number of regions in a combined higher resolution frame. The plurality of frames may further vary in resolution within a single combined higher resolution frame. For example, a combined higher resolution frame may comprise three 1080p frames, one 1280×720 frame, and a 640×360 frame.

The terms, programs and video content, as applied herein may refer to a variety of forms of video streams, video content, camera angles, videos captured via software programs, computer programs, 3-dimensional video content, and other forms of video. In this implementation, frames from four independent video streams may be embedded in the combined higher resolution frame 106. For example, four 1080p video streams may be concurrently delivered in a single 4k×2k video stream. The terms higher resolution and lower resolution as discussed herein are used to compare the relative resolution of a first resolution and a second resolution and should not be considered limiting to the disclosure. In general, the term resolution may refer to a pixel resolution of a video frame. However, in at least one implementation, resolution may refer to a pixel depth, bit depth, or color depth as discussed below.

Figure 2:
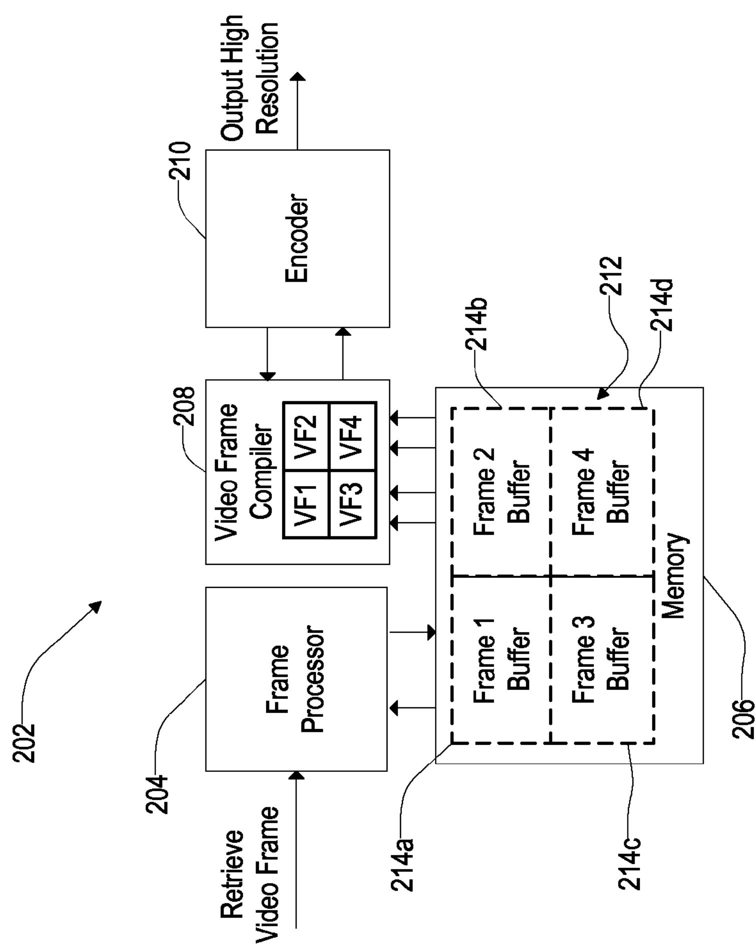
FIG. 2 is a block diagram of a system for encoding a video frame of a first resolution that comprises a plurality of video frames of a second resolution.

Referring to FIG. 2, a block diagram of a system 202 for encoding a video frame having a first resolution is shown in accordance with the teachings of the disclosure. The video frame having the first resolution may further comprise a plurality of video frames having a second resolution. The system may generally comprise a frame processor 204, a memory 206, a video frame compiler 208 and an encoder 210. The memory in this system 202 and the other systems described throughout this disclosure may comprise various forms of memory, for example, random access memory (RAM), dynamic RAM (DRAM), synchronous DRAM (SDRAM), and other forms of memory configured to store digital information.

In this particular implementation, the frame processor 204 may be configured to retrieve individual lower resolution video frames and buffer each video frame in the memory 206, for example DRAM. The memory 206 may have sufficient capacity to store a plurality of buffered video frames corresponding to at least one higher resolution video frame. In this implementation, the lower resolution video frames 214*a*, 214*b*, 214*c*, and 214*d* may be 1080p video frames and the higher resolution video frame 212 may be a 4k×2k video frame. The video frame compiler 208 may retrieve individual lower resolution video frames and combine the frames to form a single higher resolution (e.g. 4k×2k) video frame. Once the higher resolution video frame has been compiled, an encoder may retrieve each higher resolution video frame. The encoder may then encode each video frame to create a high resolution output video stream in a compressed form. The output video stream may later be processed and decompressed by a decoder as part of a video feed.

Referring now to FIGS. 1 and 2, the compiler may group the lower resolution frames 104 in a variety of arrangements and sequences. The particular arrangement of the lower resolution video frames as well as other characteristics of each of the frames may be gathered by the compiler and embedded in metadata by the encoder. The metadata may generally comprise information identifying the existence and arrangement of the lower resolution frames 104 in the combined higher resolution frame 106. The metadata may further comprise other characteristic information about the high and lower resolution frames, for example the resolution, compression data, frame rate, color depth and any information that may relate the lower resolution video frames to the higher resolution video frames. The term metadata may refer to various forms of data, for example header information, data tokens, data packets, and other identifying information that may be received in the video stream.

Figure 3:
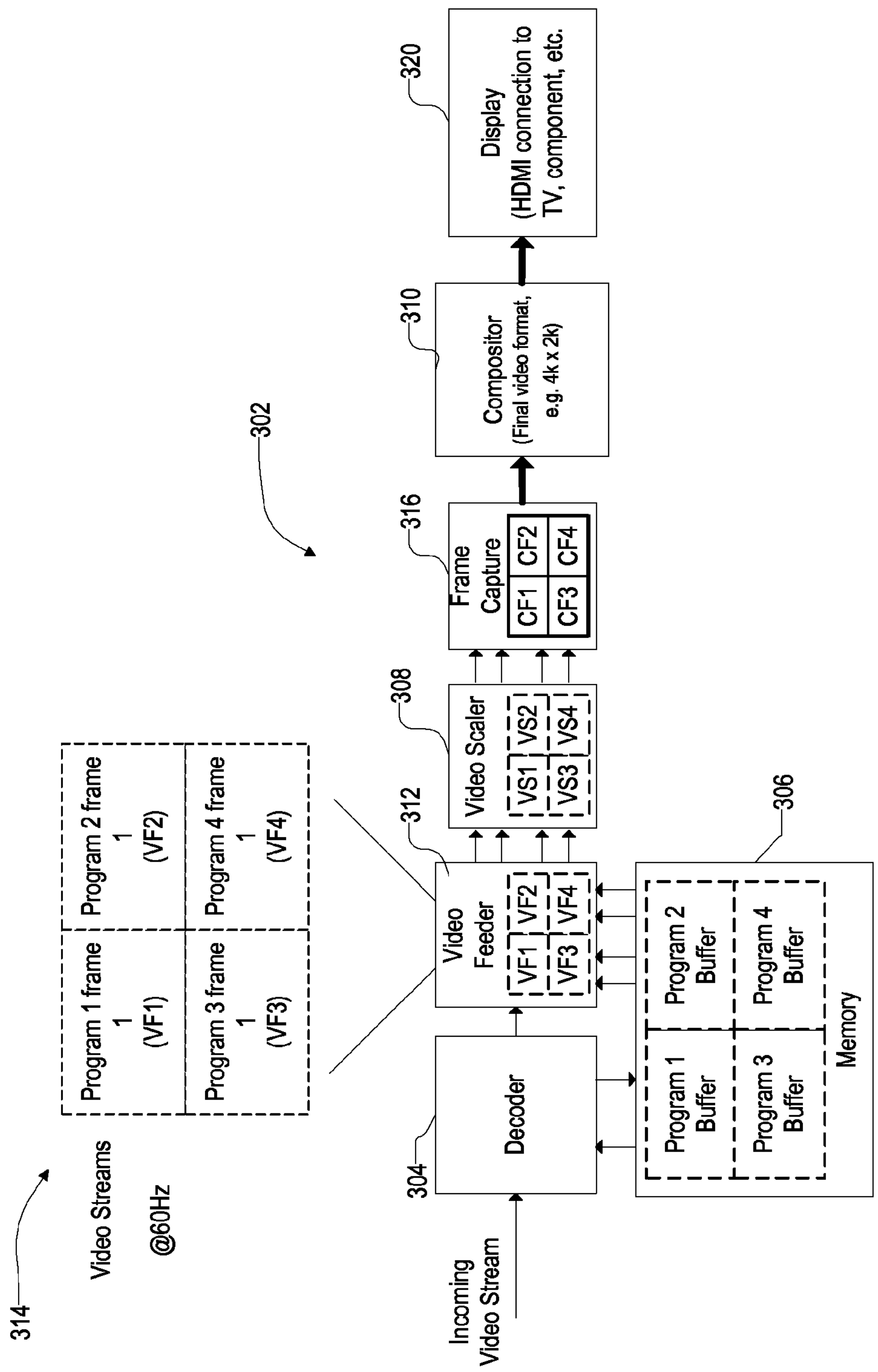
FIG. 3 is a system for decoding a video frame of a first resolution that comprises a plurality of video frames of a second resolution.

Referring now to FIG. 3, a system for decoding a video frame having a first resolution is shown in accordance with the teachings of the disclosure. The video frame having the first resolution may further comprise a plurality of video frames having a second resolution. The decoding system 302 may generally comprise a decoder 304, a memory unit 306, for example in the form of DRAM, a video scaler 308, and a video compositor 310. In response to the receipt of an incoming video stream, the system 302 may buffer one or more of the video frames of the high resolution video stream in the memory unit 306. The decoder 304 may access metadata of the frame in the memory unit 306 to determine the characteristics of the incoming high resolution video stream. The decoder 304 may then interpret the metadata corresponding to one or more higher resolution video frames of the high resolution video stream to determine identifying information about each higher resolution video frame. The identifying information may indicate that the incoming high resolution video stream comprises conventional video data, for example, a single frame of video data for a single program, or that within each higher resolution video frame a plurality of lower resolution video frames are embedded. The characteristics of the incoming high resolution video stream may then be applied throughout the decoding system to process a plurality of lower resolution video frames for display.

As the decoder 304 decompresses each higher resolution video from the video stream, each higher resolution video frame may be stored in the memory unit 306. A video feeder 312 may then retrieve one or more of the higher resolution video frames and provide each higher resolution video frame to a video scaler 308. The video scaler 308 may crop and arrange each of the lower resolution video frames as instructed by the metadata, a controller, or a user input. Upon decompression, the plurality of video frames may correspond to four 1080p video streams (e.g. 1080p programs) at 120 Hz received as one 4k×2k video frame at 120 Hz.

The scaled video frames from the video scaler 308 may then be captured by a frame capture unit 316. The frame capture unit 316 may capture the scaling and position of each lower resolution video frame for display in a single, higher resolution video frame. Upon frame capture, a combined higher resolution video frame comprising a plurality of lower resolution video frames may be supplied to the video compositor 310. The video compositor 310 may then assemble each frame in a final video format to add additional rendered graphics and enhancement. The final format of the combined higher resolution video frame may then be output from the compositor to a display unit. In order to provide for a flexible viewing experience, the system 302 may further provide for a user input configured to change viewing modes, as demonstrated in the FIG. 4.

Figure 4:
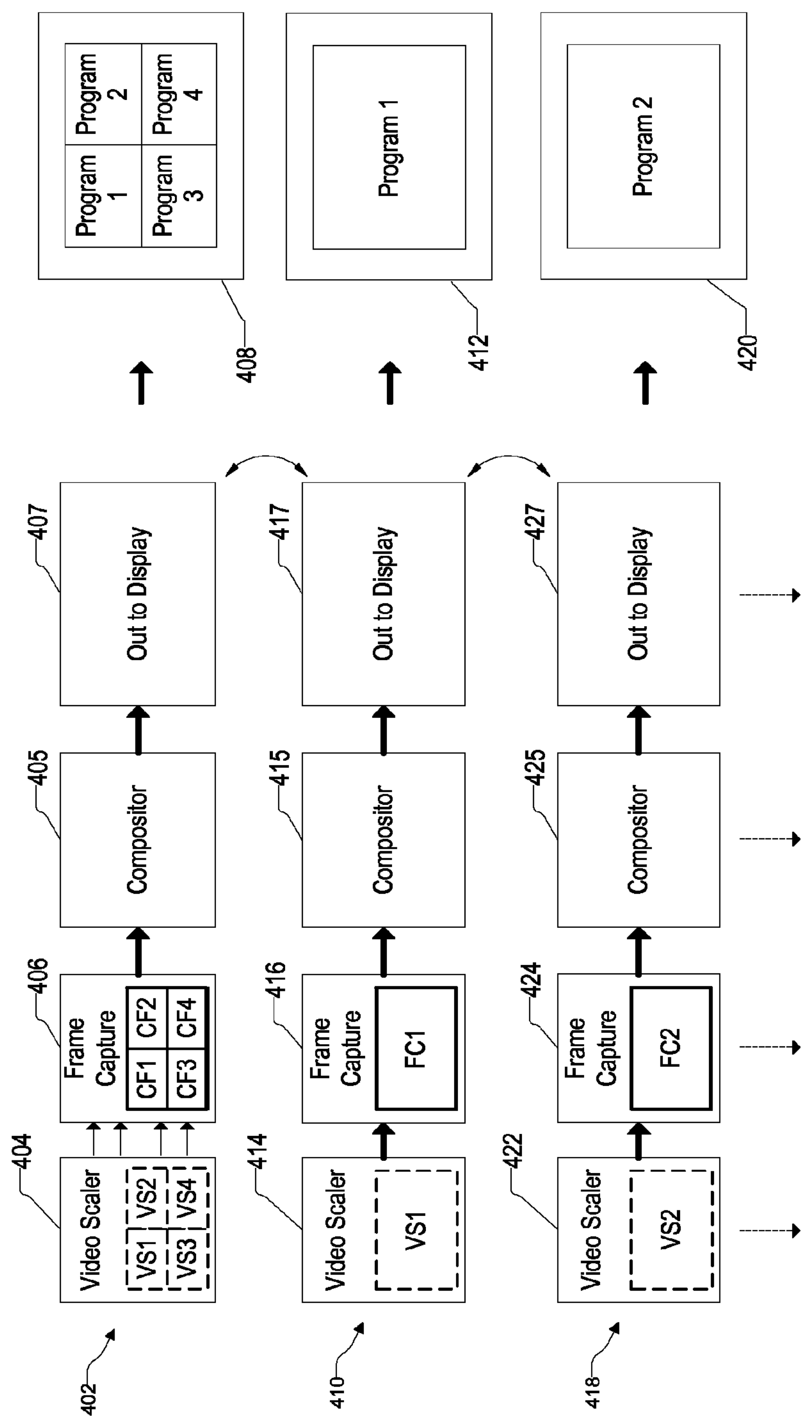
FIG. 4 is a block diagram demonstrating a plurality of operating modes for the system introduced in FIG. 3.

Referring to FIG. 4, a block diagram illustration of video modes that may be output via the decoding system 302 is shown in accordance with the teachings of the disclosure. In a first mode 402, a video scaler may retrieve four lower resolution video frames. Each of the lower resolution video frames may be cropped and scaled by a video scaler 404. The video scaler 404 allows display of the lower resolution video frames in a single higher resolution frame. Frame capture of the single higher resolution frame may then be completed by a frame capture unit 406. Each of the programs may be processed by a compositor 405 and an output module 407 to output to a display screen 408. The lower resolution video frames may be displayed concurrently as shown by Program 1, Program 2, Program 3, and Program 4 or in any variation of the positions shown. In this first mode 402, four independent lower resolution video screens are shown concurrently on a high resolution display 408. In this example, each individual lower resolution frame may comprise a 1080p frame that are provided within a 4k×2k high resolution frame.

In a second mode 410, a user may prefer to watch a single program, for example Program 1 on a full screen. The user may request this mode to be activated such that Program 1 is shown in full screen on display 412. In this case, the video scaler 414 may crop and upscale each frame of Program 1. Additionally the frame capture unit 416 may capture each frame of Program 1 for full screen display. The video frame may be processed by the compositor 415 and output module 417 for full screen output on display 412. A user may then watch Program 1 in a conventional viewing format.

A third mode 418 may be enabled similar the second mode 410 by retrieving and upscaling a single frame corresponding to Program 2. The video scaler 422 may then upscale the single video frame corresponding to Program 2. Further, the frame capture unit 424 may capture the higher resolution frame for Program 2. The video frame may be processed by the compositor 425 and output module 427. Then Program 2 may be displayed in an upscaled higher resolution format on display 420. Other modes may also be applied for a third program and a fourth program similar to modes 410 and 418. Other implementations may further provide for a plurality of lower resolution video frames to be stored in a single higher resolution video frame and may further incorporate sub-frames of the four frames shown in 408 or partial fractional portions corresponding to any resolution or a plurality of resolutions that may be arranged or transferred in a single higher resolution video frame. For example, multiple frames comprising resolutions of 1080p, 720p and 480p (DVD resolution) may be combined in a single, larger 1080p, 4k×2k, or 8k×4k, video frame. Other standard and non-standard video resolutions may also be applied in conformance with the disclosure.

The term program may be used generically in this disclosure to describe a broad range of video content. In some implementations, the lower resolution frames may comprise a plurality of camera angles that may correspond to a live broadcast or a previously recorded broadcast. For example, a plurality of camera views of a sporting event may be displayed as Programs 1, 2, 3, and 4. In another implementation, a plurality of independent video content may be displayed as Programs 1, 2, 3, and 4. Other examples of implementations for programs may further include at least one of the programs comprising rendered video content in the form of commercial advertisements, video highlights, weather reports, scores, credits, or any other video content. In the implementation comprising multiple camera views, the user may request the system to switch among the camera views in full screen mode (see 412 and 420) or display the camera angles concurrently 408.

In yet another implementation, at least one of the programs may comprise a targeted video stream comprising targeted marketing content for a specific viewer. In this implementation, the content may be provided concurrently for one or more programs as shown in 408. In addition, the content may be switched in response to metadata received in an incoming video stream or a user request to be displayed in full screen as shown in blocks 412 and 420. Other examples of programs may comprise computer software video content and other computer application related content. In these implementations, a display preference may be identified by metadata received in the video stream and may also be identified by a user preference. The metadata may include rules indicating that the advertising will be shown for a required period of time before a user may return to a selected program.

Figure 5:
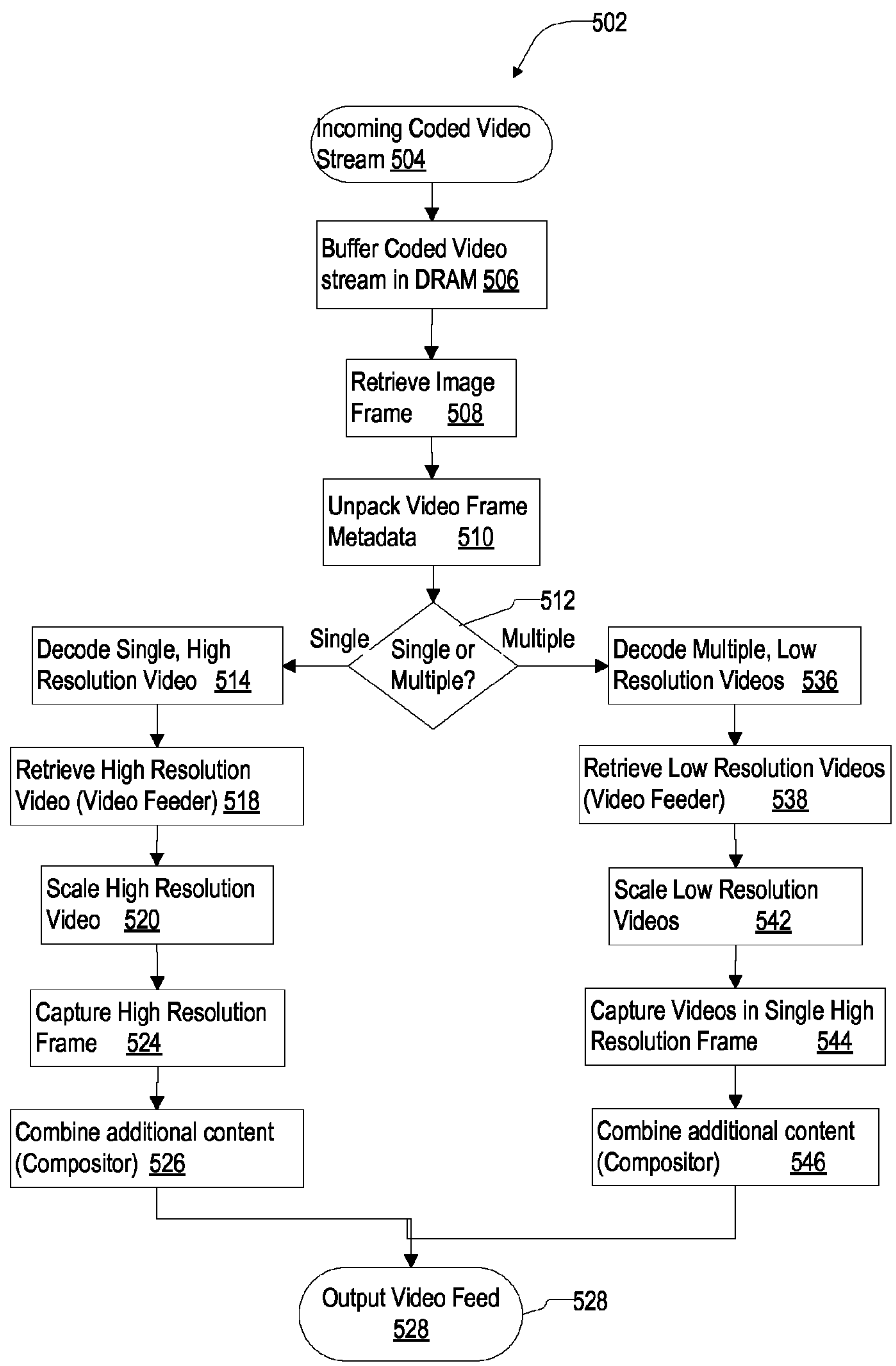
FIG. 5 is a flow chart of a method for decoding a video stream of a first resolution that comprises video content of a second resolution.

Referring to FIG. 5, a flow chart of a method for decoding a video stream is provided 502. The video stream may be encoded and transmitted at a first resolution. However, the video stream may comprise video content having a second resolution in accordance with the teachings of this disclosure. The system 302 of FIG. 3 may further be applied to display video content at high resolution displayed across an entire video display. The system 302 may also selectively display multiple lower resolution video frames in each single higher resolution video frame in response to the content of an incoming video stream. Accordingly, a coded video stream may be received by the system (504). In response to the receipt of an incoming video stream, video frames of the incoming video stream may be buffered in memory, such as DRAM (506). A video frame may be retrieved by the decoder (508). The decoder may be configured to unpack metadata corresponding to each video frame (510). Based on the metadata, the system may identify if the incoming video stream comprises embedded, lower resolution video frames (512).

Though metadata is referred to herein, identifying information corresponding to one or more frames of the incoming video stream may comprise various forms including, for example, header files, flags or other identifying information received with or within a video stream. The metadata may also be interpreted in parallel by an interpreter, an internal or external controller, an additional processor, or other circuitry configured to identify properties of an incoming video stream. The decoder may then apply the properties to decode and display the incoming video stream. In this implementation, the metadata may designate each frame of the incoming video stream as comprising a single frame intended for display similar to conventional videos (e.g. a single video stream displayed across an entire display).

If the incoming video stream comprises a single frame, the single higher resolution video frame is decoded (514) and stored in memory. The higher resolution video is then retrieved from memory (518). The higher resolution video is scaled if necessary (520). The higher resolution frame is then captured (524). Additionally, content is then combined, for example by a compositor (526). The higher resolution video is then provided to the output video feed (528).

The metadata may also designate a single frame as comprising multiple lower resolution video frames embedded within portions of a higher resolution video frame (e.g., in different quadrants). If it is determined that a video frame comprising multiple lower resolution frames has been received, the higher resolution video frame comprising the lower resolution video frames is decoded (536) and stored in memory. The method may continue retrieving each lower resolution video frame from memory (538). The lower resolution frames of each higher resolution frame may then be scaled and cropped (542). The lower resolution frames may then be captured into a final video frame (544). Following the capture of each video frame for display, additional rendered content may be added by a compositor (546). The compositor may output the multiple lower resolution videos to a display embedded in a single higher resolution video (528).

Figure 6:
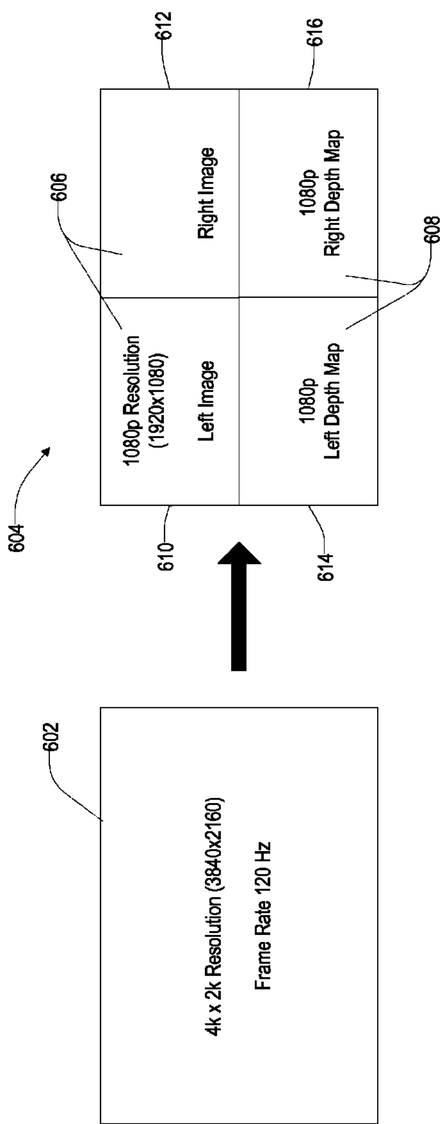
FIG. 6 is a diagram of a video frame of a first resolution comprising a plurality of video frames of a second resolution, including three-dimensional content.

Referring now to FIG. 6, a diagram of a video frame having a first resolution is provided. The first resolution video frame may have a first resolution format. Further, the first resolution video frame with the first video format may include a plurality of video frames in a second resolution format. The plurality of video frames may include three-dimensional content in accordance with the teachings of the disclosure. In this implementation, a single higher resolution video frame 602 may be implemented to display multiple lower resolution frames that may be combined to generate 3-dimensional content. Each of the lower resolution video frames may comprise respective video data corresponding to a single lower resolution 3-dimensional video frame.

The lower resolution video frames may comprise video layers 604. The video layers 604 may further comprise two, 2-dimensional (2D) video frame components 606. Further, the two video layers 604 may comprise 3-dimensional (3D) enhancement layer video components 608 (enhancement layers). As illustrated, the video layers 604 may comprise both two 2D video frame components 606 and two 3D enhancement layer components 608 that may be combined to generate a single 3D video frame. More specifically, the 2D video frames 606 may comprise a left stereo image 610 and right stereo image 612. The 3D enhancement layers 608 may comprise a left enhancement layer depth map 614 and a right enhancement layer depth map 616. Each of the lower resolution layers 604 may be combined to form a single lower resolution video frame comprising 3D depth content. In one example, the lower resolution may be 1080p and the higher resolution may be 4k×2k; however, other resolutions may be applied in accordance with the teachings of the disclosure.

Figure 7:
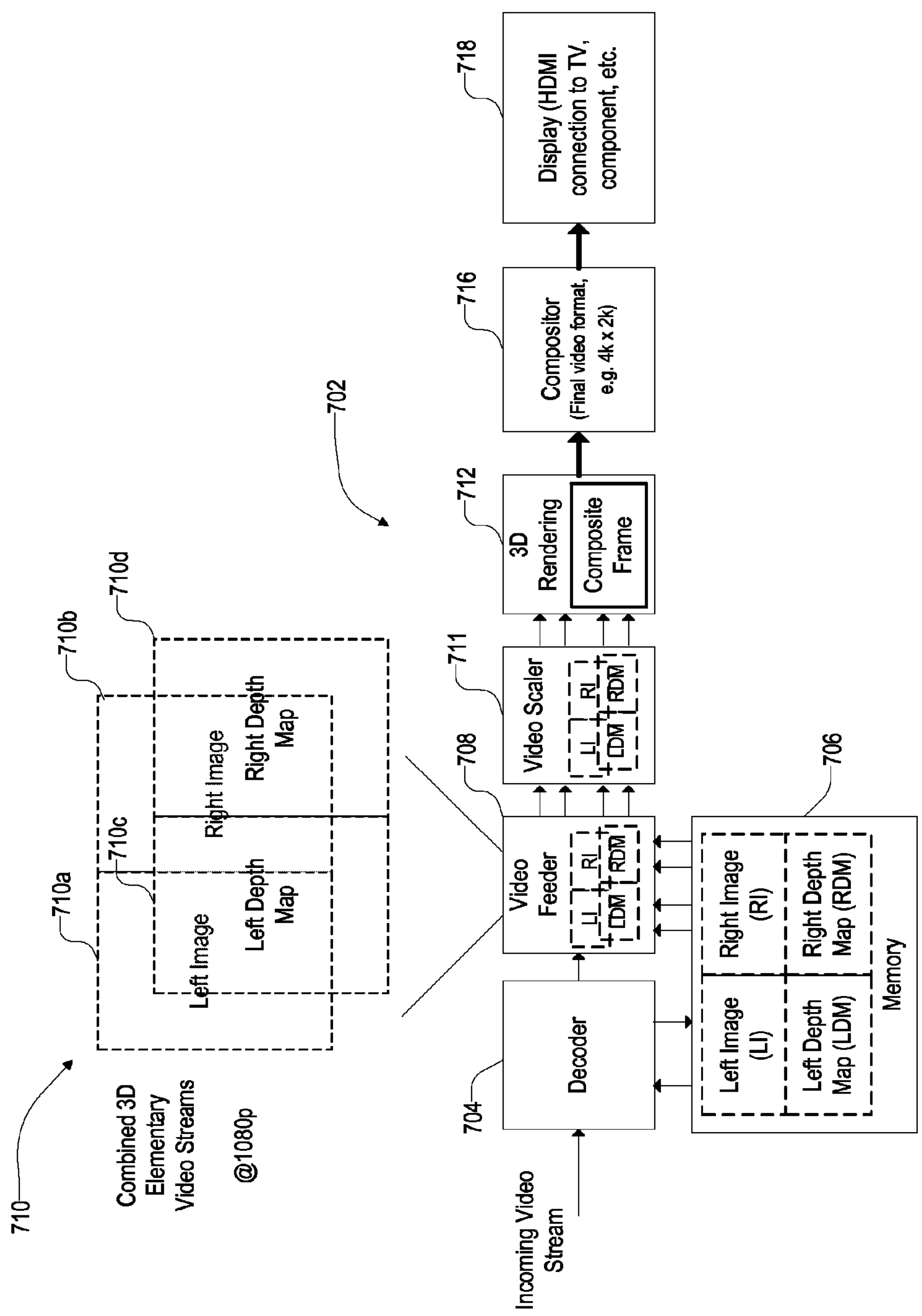
FIG. 7 is a block diagram of a system for decoding a video stream comprising three-dimensional video content.

Referring now to FIG. 7, a block diagram of a system for decoding a video stream comprising 3D video content is shown in accordance with the teachings of the disclosure. Similar to the system of FIG. 3, the system 702 may receive an incoming high resolution video stream in a decoder 704. The decoder 704 may decode the incoming high resolution video stream and buffer a plurality of video frames from each frame of the high resolution video stream in memory 706. Metadata corresponding to the plurality of video frames may be interpreted to identify properties or characteristics of the video stream. If the incoming video stream is determined to comprise video layers corresponding to 3D content, a video feeder 708 may retrieve a higher resolution frame comprising the video layers 710. From the video feeder 708, the video scaler 711 may crop, rearrange, and scale each of the lower resolution video layers. A 3D rendering engine 712 may then capture a single 3D composite frame from the combined lower resolution video layers 710. The 3D composite frame may be streamed as an outgoing 3D video stream by a video feeder 708. The video feeder 708 may control the speed of the video stream at the frame rate identified in the metadata. The 3D video stream may be combined with rendered graphics in a compositor 716 for display 718.

In this implementation, four video layers (710*a*, 710*b*, 710*c*, 710*d*) are supplied in a single higher resolution video frame. The four video layers may be combined to produce a single, lower resolution 3D video frame. When produced in succession, the lower resolution 3D video frames may form a lower resolution 3D video stream. The methods and systems disclosed herein may combine a variety of lower resolution video content in a single higher resolution video frame. Examples of lower resolution content may comprise a variety of video content, programs, enhancement layers, interactive marketing information, and multiple camera views.

Figure 8:
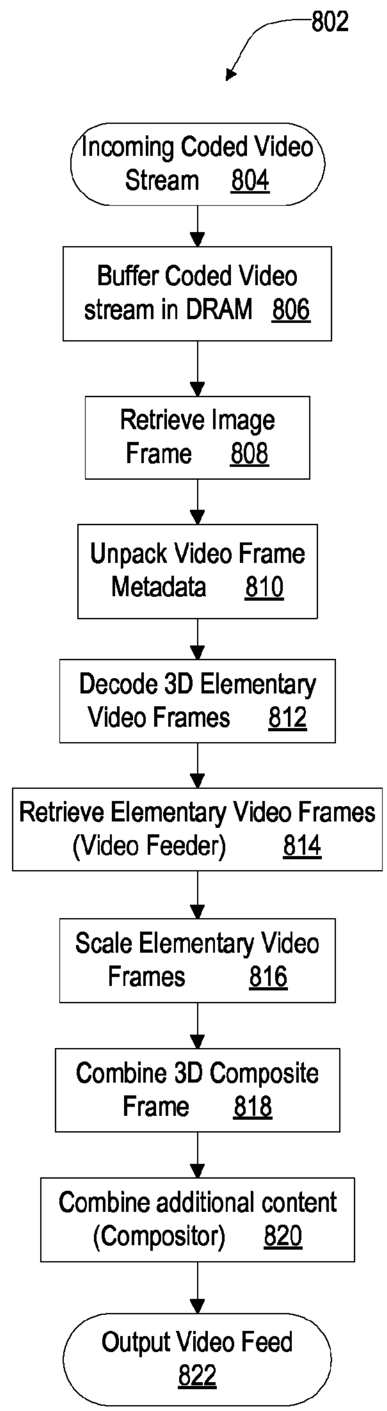
FIG. 8 is a flow chart of a method for decoding a video stream comprising three-dimensional video content.

Referring now to FIG. 8, a flow chart of a method for decoding a video stream comprising 3D video content is shown in accordance with the teachings of the disclosure (802). The method may be initialized by receiving a coded high resolution video stream (804). Each frame of the video stream may be buffered in memory, for example DRAM (806). Once at least one higher resolution video frame has been buffered in the memory, the higher resolution video frame may be retrieved from memory (808). The metadata may then be unpacked to identify properties of the video frame received (810). From the metadata, the decoder may identify that the higher resolution video frame comprises 3D video frames. The higher resolution frame may then be decoded (812) and stored in memory. After decoding, a video feeder may retrieve the video frames from memory (814). The video frames may then be scaled by a video scaler (816). The video frames may then be combined in a 3D rendering engine to create a single lower resolution 3D video frame (818). The 3D video frame may then be combined with additional rendered graphics, for example in a compositor (820). The 3D video frame may be output to a display as a lower resolution 3D video feed (822).

Figure 9:
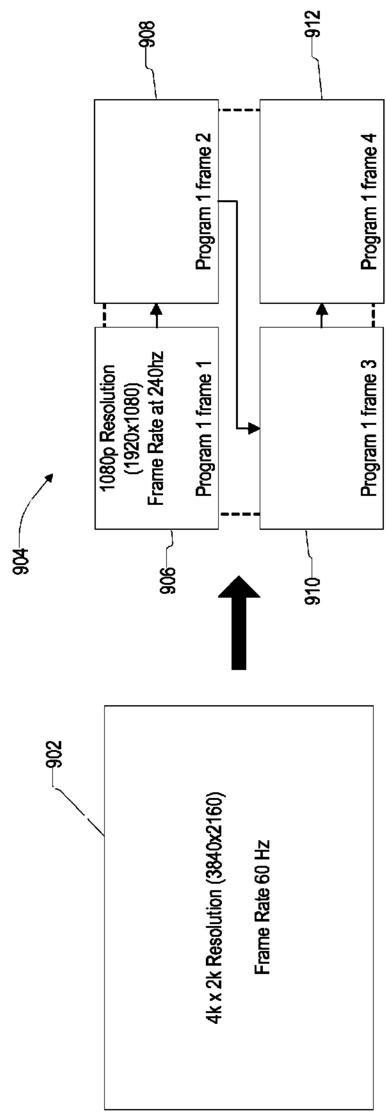
FIG. 9 is a diagram of a video frame of a first resolution that comprises a plurality of video frames having an increased frame rate.

Referring to FIG. 9, a diagram of a video frame is provided in accordance with the teachings of the disclosure. The video frame has a first resolution and may be provided at a first frame rate. The video frame of the first resolution may comprise a plurality of video frames having a second resolution and a second frame rate. In one implementation, a higher resolution video frame 902 has a plurality of lower resolution frames embedded within itself. The higher resolution video frame 902 may have a resolution of 4k×2k and a frame rate of 60 Hz. The plurality of lower resolution video frames 904 may comprise four consecutive 1080p frames of the same video program, each frame at a frame rate of 240 Hz. The frame rate of each lower resolution frame may be four times greater than the frame rate of the higher resolution frame, while the resolution may be four times lower.

In this implementation, a single program, denoted Program 1, may have four consecutive frames, a first frame 906, a second frame 908, a third frame 910, and a fourth frame 912. By storing four lower resolution frames 904 in the higher resolution frame 902, a video stream comprising higher resolution video frames may be configured to deliver a lower resolution video feed having a frame rate four times higher than the high resolution video stream. In some implementations, the higher resolution video frame 902 may be 4k×2k in resolution and the lower resolution video frames 904 may be 1080p in resolution. In other implementations, each higher resolution frame and lower resolution frame may comprise a different high and low frame resolution respectively. Another example of a higher resolution frame may be a 7,680×. 4,320 pixel frame (8k) having sixteen 1080p frames embedded within the 8k frame. Yet another example may comprise four 4k×2k frames embedded in the 8k frame.

The lower resolution frames 904 in this implementation are arranged with the first frame 906 in the upper left quadrant, the second frame 908 in the upper right quadrant, the third frame 910 in the lower left quadrant, and the fourth frame 912 in the lower right quadrant. This order is further denoted by the arrows demonstrating the frame sequence. In some implementations, each of the lower resolution frames may be stored in different quadrants of the higher resolution frame 902. For example, the first frame 906 may be in the upper left quadrant, the second frame 908 may be in the lower left quadrant, the third frame 910 may be in the upper right quadrant, and the fourth frame 912 may be in the lower right quadrant. Yet another implementation may comprise the first frame 906 in the upper left quadrant, the second frame 908 in the upper right quadrant, the third frame 910 in the lower right quadrant, and the fourth frame 912 in the lower left quadrant. The arrangements of the lower resolution frames 904 discussed in regard to this implementation may generally be applied to any of the implementations discussed in this disclosure.

Figure 10:
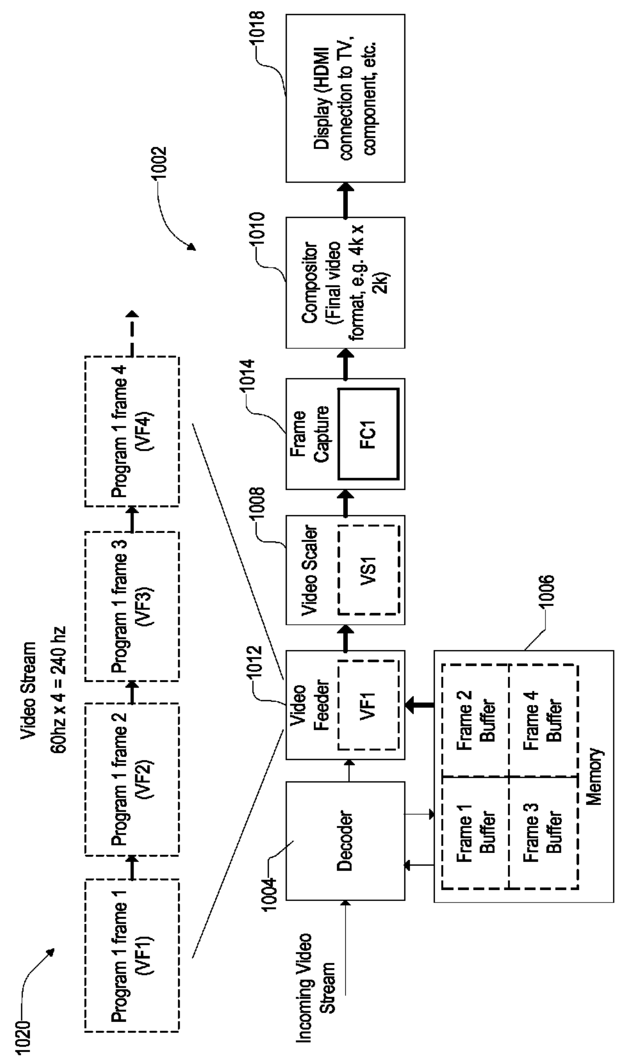
FIG. 10 is a system for decoding a video frame of a first resolution comprising a plurality of video frames having an increased frame rate and a second resolution.

Referring now to FIG. 10, a system 1002 for decoding a video frame having a first resolution is shown. The video frame having a first resolution may comprise a plurality of video frames having a second resolution and an increased frame rate. The system 1002 may generally comprise a decoder 1004, a memory unit 1006, a video scaler 1008, and a compositor 1010. Similar to the other implementations discussed, the decoder may be activated in response to an incoming video stream. The decoder 1004 may then buffer at least one frame of the incoming video stream into memory 1006, for example DRAM. In this implementation, the incoming video stream may comprise a plurality of higher resolution video frames, each higher resolution video frame comprising four lower resolution video frames.

With at least one higher resolution video frame buffered in memory 1006, the decoder may unpack header information for the higher resolution video frame and determine the properties of the embedded lower resolution video frames. The four lower resolution video frames may comprise four 1080p frames at 240 Hz as discussed in reference to FIG. 9. Each of the lower resolution video frames may be identified and decoded by the decoder 1004. The lower resolution video frames may then be retrieved from memory 1006 by a video feeder 1012 and supplied to the video scaler 1008. In the video scaler 1008, the four individual frames of the single higher resolution frame may be cropped and scaled to a target display resolution. A frame capture unit 1014 may then capture the individual frames and generate a lower resolution video stream at the increased frame rate. The compositor 1010 may then add additional video frame content and output the video stream to a display 1018.

Once the video scaler 1008 has cropped and scaled the first four frames, the following four frames of the next higher resolution video frame may be retrieved. This process may continue while the incoming video stream is being processed. The system 1002 may follow instructions for the sequence of the lower resolution frames within each higher resolution frame from metadata provided in the video stream. The outgoing video stream from the display 1018 may comprise each of the lower resolution video frames being displayed consecutively to provide enhanced motion data in lower resolution. Similar to the other disclosed implementations, the frame rate of the lower resolution and higher resolution video frames may vary. Some examples of combinations of frame rates that may be similarly applied may comprise 30 Hz and 120 Hz, 50 Hz and 100 Hz, 120 Hz and, 120 Hz and 480 Hz, etc.

Figure 11:
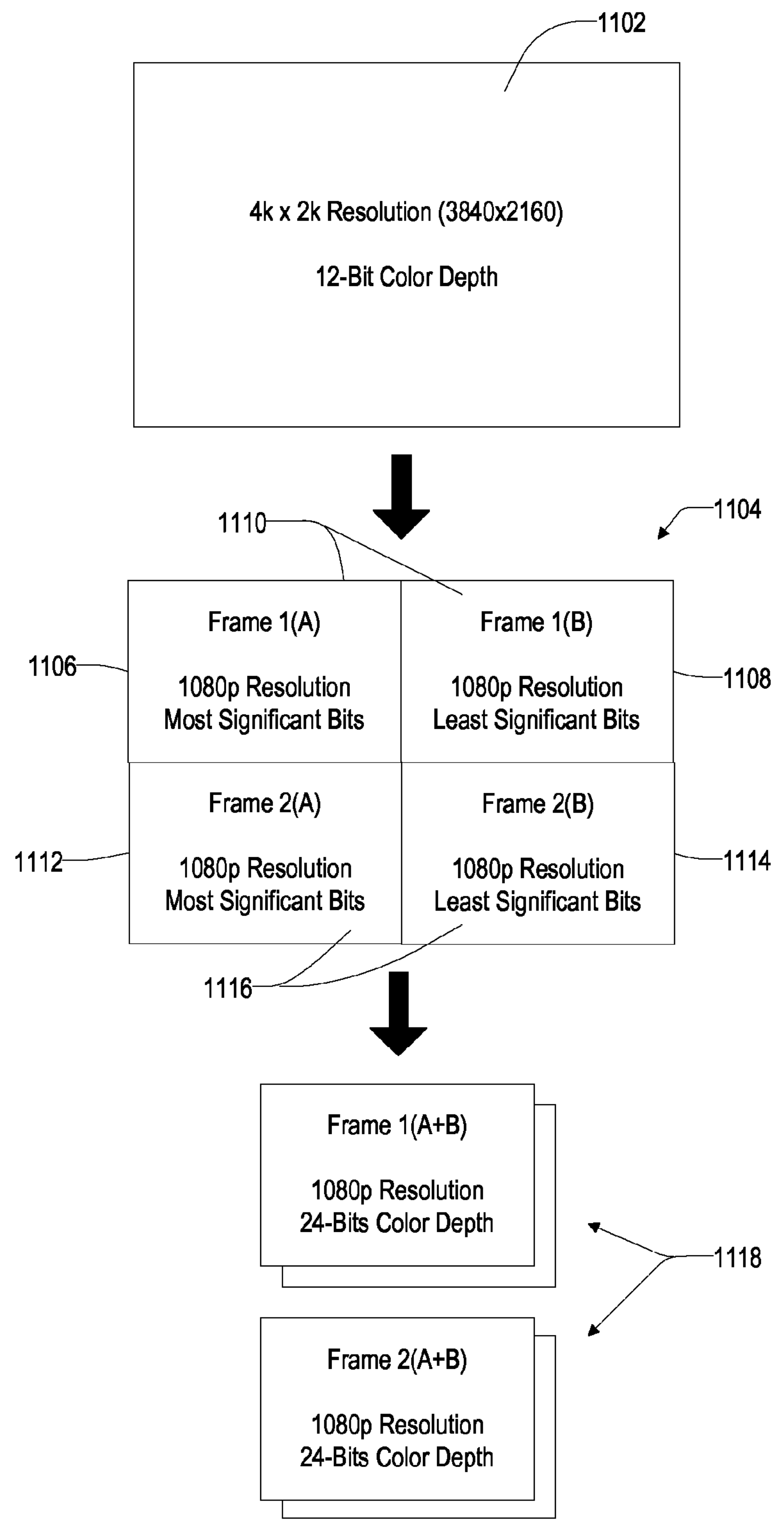
FIG. 11 is a diagram of a video frame having a first bit depth in accordance with the teachings of the disclosure.

Referring to FIG. 11, a diagram of a video frame 1102 having a first bit depth is shown in accordance with the teachings of the disclosure. The bit depth may indicate the number of bits used to indicate the color of a single pixel and may define a color depth. In this implementation, the video frame 1102 may comprise a first color depth and may have a high resolution (e.g. 4k×2k). The video frame 1102 may further comprise a plurality of video frames 1104 having a second color depth. The plurality of video frames 1104 may comprise four lower resolution (e.g. 1080p) video frames. In some implementations, the first color depth may define a lower color depth precision than the second color depth. In this example, the first color depth may be 12-bits and the second color depth may be 24-bits. The color depth may define the number of bits used to indicate the color of each pixel of each video frame.

Though color depth is discussed in this implementation, the bit depth may define other frame and pixel properties. Bit depth may refer to the precision of pixel component data and pixel color components. In some instances, bit depth may refer to the luminance and chrominance of a pixel. Pixel component data may be communicated through a plurality of subsampling methods that may comprise 4:2:0, 4:2:2, 4:2:1, 4:1:1, 4:1:0, 4:4:4, and other subsampling schemes. In some implementations, the bit depth may refer to a pixel intensity that may further define additional pixel data. The various disclosed implementations may further be combined to define a plurality of partial video frames comprising any combination of frame and pixel properties.

The plurality of video frames 1104 may further define a first partial video frame 1106 comprising the most significant bits of the second color depth and a second partial video frame 1108 comprising the least significant bits of the second color depth. In this example, the first partial video frame 1106 may comprise the twelve most significant bits of color depth of each pixel of the first video frame. The second partial video frame 1108 may comprise the twelve least significant bits of color depth of each pixel of the second video frame. The first partial video frame 1106 and the second partial video frame 1108 may be combined to form a first video frame 1110 having the second color depth.

The plurality of video frames 1104 may further define a third partial video frame 1112 comprising the most significant bits of the second color depth and a fourth partial video frame 1114 comprising the least significant bits of the second color depth. Similar to the first partial video frame 1106, the third partial video frame 1114 may comprise the 12 most significant bits of color depth of each pixel of the first video frame. Further, the second partial video frame 1108 may be similar to the third partial video frame comprising the 12 least significant bits of color depth of each pixel of the fourth video frame. The third partial video frame 1112 and the fourth partial video frame 1114 may also be combined to form a second video frame 1116 having the second color depth, for example, a precision of 24 bits or twice the first color depth.

When the first video frame 1110 and the second video frame are both combined with their corresponding, partial video frames, the first video frame 1110 and the second video frame 1116 may further define a sequence of lower resolution video frames 1118. The sequence of lower resolution video frames 1118 may correspond to consecutive frames in a low pixel resolution video stream having the second color depth. The sequence of lower resolution video frames may be streamed in a system similar to those disclosed herein by combining the partial video frames 1106-1108 and 1110-1112 to form the sequence of lower resolution video frames 1118 having the second color depth.

Though the first color depth and the second color depth in this example were 12-bit and 24-bit respectively, other combinations of color depth may be applied similarly. Other examples of color depth combinations may comprise 8-bit and 16-bit, 6-bit and 12-bit, and 4-bit and 8-bit color depths. The video frame 1102 having the first color depth and the plurality of video frames 1104 having the second color depth may also vary in pixel resolution. In one implementation, the video frame having a first color depth may have a resolution of 8k and the plurality of video frames having a second resolution may have a resolution of 1080p. In this implementation, the plurality of video frames having a second resolution may comprise eight partial video frames. The eight partial video frames may be combined to form four lower resolution video frames having a second color depth. Other combinations of color depth and resolution may also be applied in accordance with this disclosure.

Similar to other processes introduced in this disclosure, the lower resolution video stream having the second color depth may be delivered in a high resolution video stream having the first color depth. As each frame of the high resolution video stream is received, each frame may be buffered in a memory unit. A decoder may then decompress a frame of the high resolution stream. Metadata accompanying the frame of the high resolution video stream may then be interpreted to identify that the frame of the high resolution video stream comprises a plurality of partial video frames having a lower resolution. The partial video frames having a lower resolution may be cropped and combined in a scaler to form a plurality of lower resolution video frames having the second color depth. Each of the lower resolution video frames having the second color depth may then be captured in a frame capture unit and output for display.

It is noted that the various modules and/or circuitries (e.g., encoding modules and/or circuitries, decoding modules and/or circuitries, encoder rate adaptation modules and/or circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

Various aspects of the present disclosure have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow charts may also have been arbitrarily defined herein to illustrate certain significant functionality. To the extent used, the flow chart boundaries and sequence could have been defined otherwise and still perform the certain significant functionality. Such alternate definitions of both functional building blocks and flow diagram blocks and sequences are thus within the scope and spirit of the claimed disclosure.

As a person skilled in the art will readily appreciate, the above description is meant as an illustration of the principles of this disclosure. This description is not intended to limit the scope or application of this disclosure in that the disclosure is susceptible to modification, variation and change, without departing from spirit of this disclosure, as defined in the following claims.

What is claimed is:

1. A method for video processing, the method comprising:
receiving a first video stream comprising first resolution video frames, at least one of the first resolution video frames being defined to comprise a plurality of second resolution video frames;
presenting a user input selection; and
selecting between a first operation mode simultaneously displaying the plurality of second resolution video frames and a second operation mode displaying a scaled version of one of the plurality of second resolution video frames.

2. The method according to claim 1, wherein the first resolution video frame has a greater number of pixels than the second resolution video frames.

3. The method according to claim 2, wherein the first resolution video frame has four times the number of pixels than the second resolution video frames.

4. The method according to claim 1, wherein the scaled version of the one of the plurality of second resolution video frames has a greater number of pixels than the plurality of second resolution video frames.

5. The method according to claim 4, wherein the scaled version of the one of the plurality of second resolution video frames has a same number of pixels as the at least on the of the first resolution video frames.

6. The method according to claim 1, wherein each of the plurality of second resolution video frames comprises a different program.

7. The method according to claim 1, further comprising receiving the first resolution frame in a video codec.

8. The method according to claim 7, further comprising cropping the plurality of second resolution video frames from the first resolution video frame.

9. The method according to claim 1, wherein the first resolution video frame is a 4k×2k video frame and the second resolution video frames are 1080p video frames.

10. An apparatus for processing video data comprising lower resolution video data embedded in high resolution video data, the apparatus comprising:
a memory unit;
a processor operably coupled to the memory unit, the processor configured to:
buffer a higher resolution video frame in the memory unit, the higher resolution video frame comprising a plurality of lower resolution video frames; and
select between a first operation mode simultaneously rendering the plurality of lower resolution video frames and a second operation mode rendering a scaled version of one of the plurality of lower resolution video frames.

11. The apparatus according to claim 10, wherein the higher resolution video frame comprises four lower resolution video frames.

12. The apparatus according to claim 10, wherein each frame of the plurality of lower resolution video frames comprises a different program.

13. The apparatus according to claim 10, wherein the scaled version of the one of the plurality of lower resolution video frames has a greater number of pixels than the plurality of lower resolution video frames.

14. The apparatus according to claim 13, wherein the scaled version of the one of the plurality of lower resolution video frames has a same number of pixels as the higher resolution video frame.

15. A system for processing video data, the system comprising:
a memory unit;
a frame processing unit operably coupled to the memory unit, the frame processing unit being configured to retrieve a plurality of higher resolution video frames, extract a plurality of lower resolution video frames from the higher resolution video frames, and store the lower resolution video frames in the memory unit; and
a video output unit operably coupled to the memory unit, the video output unit selectively displaying the plurality of lower resolution video frames or displaying a scaled version of one of the plurality of lower resolution video frames.

16. The system according to claim 15, wherein the scaled version of the one of the plurality of lower resolution video frames has a greater number of pixels than the plurality of lower resolution video frames.

17. The system according to claim 16, wherein the scaled version of the one of the plurality of lower resolution video frames has a same number of pixels as the higher resolution video frames.

18. The system according to claim 15, wherein the higher resolution video frames have a greater number of pixels than the lower resolution video frames.

19. The system according to claim 18, wherein the higher resolution video frames have four times the number of pixels than the lower resolution video frames.

20. The system according to claim 15, wherein individual frames of the plurality of lower resolution video frames comprise different programs.

* * * * *